(12) United States Patent
Verma et al.

(10) Patent No.: US 11,924,028 B2
(45) Date of Patent: Mar. 5, 2024

(54) DELAYED INSTANTIATION OF NETWORK SLICES

(71) Applicant: INTERNATIONAL BUSINESS MACHINES CORPORATION, Armonk, NY (US)

(72) Inventors: Dinesh C. Verma, New Castle, NY (US); Mudhakar Srivatsa, White Plains, NY (US); Utpal Mangla, Toronto (CA); Mathews Thomas, Flower Mound, TX (US); Satish Sadagopan, Leawood, KS (US)

(73) Assignee: International Business Machines Corporation, Armonk, NY (US)

( * ) Notice: Subject to any disclaimer, the term of this patent is extended or adjusted under 35 U.S.C. 154(b) by 53 days.

(21) Appl. No.: 17/183,456

(22) Filed: Feb. 24, 2021

(65) Prior Publication Data

US 2022/0271992 A1 Aug. 25, 2022

(51) Int. Cl.
*H04W 24/08* (2009.01)
*H04L 41/0803* (2022.01)

(52) U.S. Cl.
CPC ......... *H04L 41/0803* (2013.01); *H04W 24/08* (2013.01)

(58) Field of Classification Search
CPC ..... H04W 48/00; H04W 48/06; H04W 48/02; H04W 48/16
See application file for complete search history.

(56) References Cited

U.S. PATENT DOCUMENTS

| 8,787,203 | B2 | 7/2014 | Miyamura |
| 10,129,108 | B2 | 11/2018 | Vrzic |
| 2016/0360466 | A1* | 12/2016 | Barak ............... H04W 76/10 |
| 2020/0068473 | A1* | 2/2020 | Tang ................ H04L 5/0001 |

(Continued)

OTHER PUBLICATIONS

Bagaa, et al, "Coalitional Game for the Creation of Efficient Virtual Core Network Slices in 5G Mobile Systems", IEEE Journal on Selected Areas in Communications, vol. 36, No. 3, Mar. 2018, pp. 469-484.

(Continued)

*Primary Examiner* — Hashim S Bhatti
*Assistant Examiner* — Hector Reyes
(74) *Attorney, Agent, or Firm* — David Spalding

(57) ABSTRACT

A computer-implemented method and a computer system establish network slices within a physical network having a plurality of network elements. The method includes receiving a request to instantiate a network slice at a network element. The method also includes determining a performance metric of the network element. The method further includes delaying instantiation of the requested network slice within the network element in response to determining that the performance metric of the network element is below a threshold. The method also includes instantiating the requested network slice within the network element in response to determining that the performance metric of the network element is at or above the threshold. Finally, the method includes deactivating the requested network slice in response to determining that the performance metric of the network element is below the threshold at a time subsequent to instantiating the requested network slice.

21 Claims, 6 Drawing Sheets

(56) References Cited

U.S. PATENT DOCUMENTS

| | | | | |
|---|---|---|---|---|
| 2020/0137621 A1* | 4/2020 | Yang | ................ | H04W 28/0289 |
| 2020/0178093 A1* | 6/2020 | Peng | ............... | H04W 36/00837 |
| 2020/0367090 A1* | 11/2020 | Zhang | ............... | H04W 28/0247 |
| 2021/0321325 A1* | 10/2021 | Srivastava | .......... | H04L 41/0893 |
| 2021/0409962 A1* | 12/2021 | Kwok | ................... | H04L 47/823 |
| 2022/0030510 A1* | 1/2022 | Fukuoka | ........... | H04W 28/0236 |
| 2022/0046652 A1* | 2/2022 | Yang | .................... | H04W 48/02 |

OTHER PUBLICATIONS

Medeiros, et al, "End-to-end elasticity control of cloud-network slices", Internet Technology Letters, Apr. 30, 2019, 6 pages.

Mell et al., "The NIST Definition of Cloud Computing", National Institute of Standards and Technology, Special Publication 800-145, Sep. 2011, pp. 1-7.

Minami, et al, "An Architecture and Implementation of Automatic Network Slicing for Microservices", IEEE, 2018, 4 pages.

Sciancalepore, et al, "ONETS: Online Network Slice Broker from Theory to Practice", arXiv:1801.03484[cs.NI], Nov. 5, 2020, 13 pages.

Shen, et al, "AI-Assisted Network-Slicing Based Next-Generation Wireless Networks", ResearchGate, Jan. 2020, https://www.researchgate.net/publication/338492748, 22 pages.

Singh, et al, "Machine Learning-Based Network Sub-Slicing Framework in a Sustainable 5G Environment", Sustainability, Aug. 3, 2020, 22 pages.

Tang, et al, "Adaptive Virtual Resource Allocation in 5G Network Slicing Using Constrained Markov Decision Process", IEEE Access, Nov. 9, 2018, pp. 61184-61195.

Vassilaras, et al, "The Algorithmic Aspects of Network Slicing", IEEE Communications Magazine, Aug. 2017, pp. 112-119.

Wang, et al, "Research on Multi-attribute Controller for Virtual Data Domain Based on Software Definition Network", International Journal of Distributed Sensor Networks, 2019, vol. 15(7), 11 pages.

Zhou, et al, "Dynamic Network Slice Scaling Assisted by Prediction in 5G Network", IEEE Access, Jul. 31, 2020, pp. 133700-133712.

* cited by examiner

US 11,924,028 B2

DELAYED INSTANTIATION OF NETWORK SLICES

BACKGROUND

Embodiments relate generally to computer networks, and more particularly to delaying the instantiation of network slices within a network element until network element resource utilization demands require it to enable rapid setup and ease the processing load of a network element.

Many network architectures provide support for creating virtual networks as overlay abstractions on top of physical networks, e.g., the concept of network slices in 5G networks. The physical network may consist of many different network elements, or "nodes", connected by links. Within each of these nodes, support for virtual network functions may be implemented by means of hardware accelerators or via software implementations. In both types of implementation, a record for maintaining the identity of different virtual networks and their state is required separate from the data packet that is transmitted. The type of state maintained depends on the reason for setting up the virtual network. As an example, network slices of 5G networks are virtual network instances, but it should be noted that virtual networks may exist in any type of network environment.

SUMMARY

An embodiment is directed to a computer-implemented method for establishing network slices within a physical network having a plurality of network elements. The method may include receiving a request to instantiate a network slice at a network element. The method may also include determining a performance metric of the network element. In addition, the method may include delaying instantiation of the requested network slice within the network element in response to determining that the performance metric of the network element is below a threshold.

In an embodiment, the delaying the instantiation of the requested network slice within the network element may include storing the request to instantiate a network slice in a control path table of network slices in the network element.

The method may further include storing a request to instantiate a network slice in a data path table of network slices in the network element in response to determining that the performance metric of the network element is within a margin of the threshold. The method may also include instantiating the requested network slice within the network element in response to determining that the performance metric of the network element is at or above the threshold. Finally, the method may include deactivating the requested network slice in response to determining that the performance metric of the network element is below the threshold at a time subsequent to instantiating the requested network slice.

In an embodiment, a machine learning model may be used to determine the threshold. In addition, in an embodiment the performance metric is a latency metric.

In addition to a computer-implemented method, an additional embodiment are directed to a computer system and a computer program product for establishing network slices within a physical network having a plurality of network elements.

A further embodiment is directed to a computer-implemented method for aggregating network slices within a network element. The method includes receiving a plurality of requests to instantiate a network slice within a network element. Each request to instantiate a network slice within the network element includes a service level requirement for the respective requested network slice. The method also includes determining a performance metric of the network element. The method further includes delaying instantiation of at least one of the plurality of requests to instantiate a network slice within the network element in response to determining that the performance metric of the network element is below a first threshold.

In an embodiment, the plurality of requests to instantiate a network slice includes first and second requests to instantiate a network slice. The first request is associated with a first level of service requirement. The second request is associated with a second level of service requirement. The first and second level of service requirements may be different or distinct. The method may also include instantiating a first aggregate network slice within the network element in response to determining that the performance metric of the network element is above the first threshold and below a second threshold. The first aggregate network slice within the network element is associated with a third service level requirement. In addition, the method may include associating the first request to instantiate a network slice with the instantiated first aggregate network slice. The first level of service requirement is met when the third level of service requirement is met. Further, the method may include instantiating a second aggregate network slice within the network element in response to determining that the performance metric of the network element is above the first threshold and above the second threshold. The second aggregate network slice is associated with a fourth level of service requirement. In addition, the method may include associating the second request to instantiate a network slice with the instantiated second aggregate network slice. The second level of service requirement is met when the fourth level of service requirement is met. Finally, the method may include deactivating the first aggregate network slice in response to determining that the performance metric of the network element is below the first threshold at a time subsequent to instantiating the first aggregate network slice.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
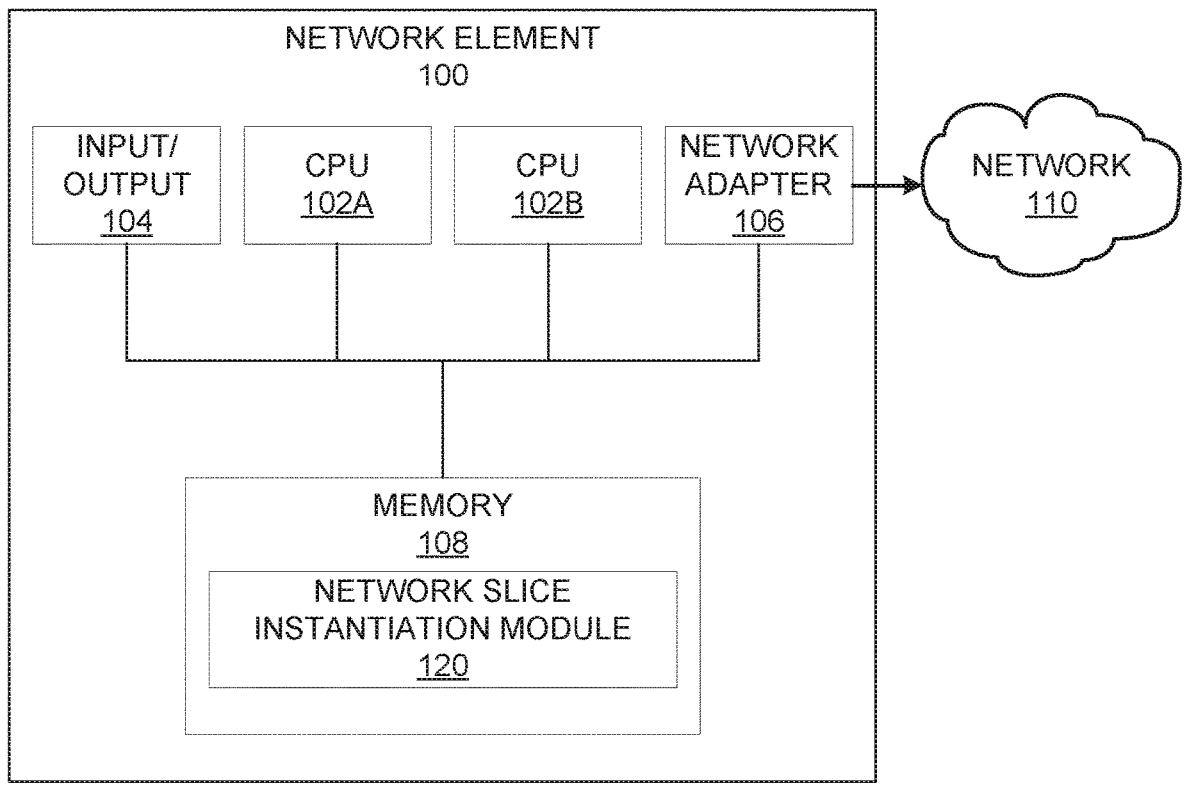
FIG. 1 is a block diagram of an example computer system in which various embodiments may be implemented.

Virtual networks, or network slices, allow customization of network functions but creating network slices may add significant performance overhead in the implementation of network functions. In many cases, instantiating network slices degrades performance more than simply supporting best-effort traffic due to the inherent inefficiencies of the implementation. Existing work on support of network slices has focused on complex optimizations to determine appropriate mappings to support network slices within a physical network and similar complex resource optimization approaches (or complex mappings) to a network function virtualization (NFV) implementation. However, this complexity is itself the reason why network slices may impose significant overhead on the network and result in poor performance. There is a need for mechanisms that obtain the benefits of network slices without paying heavily for the implementation overhead. In situations where network slices create more overhead than justified by the added value, such a mechanism may create a record of the request for network slices without actually instantiating them. In such a scenario, the network slices are only instantiated when the workload is such that separation of resources into network slices is better for the performance and the overhead of network slices is avoided unless network slices provide the value of improved performance and isolation.

Network slices may be set up for isolation, such as a need to separate a specific function of the traffic from all others, or for performance, where a certain function may need a specific amount of dedicated network bandwidth. In the case of isolation, network slices may need to be put on separate servers (for software implementations) or be switched along different physical paths (for a hardware implementation). In the case of performance, state maintenance may require rate control functions, load balancing, matching them to network functions running on different types of servers, and other types of information which would need to be maintained and updated.

The goal of creating and maintaining network slices in a network environment is to provide the most efficient end-to-end communication possible by ensuring that a selected set of network slices are given priority service and that selected traffic is mapped to the right type of resources. However, the creation and maintenance of network slices may increase the cost of supporting network slices, and in certain scenarios may result in degraded performance at the worst possible time—when the resources at a node are getting overwhelmed. To illustrate, when the number of network slices being supported at a single node is large (for instance, it is typical to see thousands and even millions of slices in the core of a large cellular network), instantiation of the network slices may itself impose significant overhead. This overhead may include the time required to look up the specific slice an inbound network packet is intended for and also time to update the statistics about that network slice once the packet is processed. When resources at a node are constrained due to a large volume of network packets that require processing, separation of processing among the different network states may be useful to insulate the performance of different types of preferred traffic from the performance of the other types of traffic. However, when the network node is only lightly loaded, the same separation of processing per network state may slow down the processing of the packets due to increased overhead.

A "lazy evaluation method" may be used to avoid significant overhead and slowing down the network when the number of network slices is large. In such a method, when a network slice is established, the individual network elements would not implement any separation mechanisms for supporting the network slices. Instead, only a record of the network slice requiring support would be created. All packets would continue to be forwarded as fast as possible without tracking any specific performance requirements. When an individual node sees that its resources are getting overwhelmed, e.g., the incoming rate of packets exceeds a certain threshold or an aggregate level metric such as net latency through the network node increases to a value that may violate the performance requirements of a network slice, then the method may implement the mechanism for network slices. Instead of trying to create a separate measurement criteria or state for each specific slice, the method may create "aggregate slices" to separate the network slices into multiple groups, thereby avoiding the need to maintain and track the state of each individual network slice.

As an example, consider a network element in a physical network where 1000 network slices have been established and 900 of these slices are for low latency IoT traffic, where they need to be processed by the network element with aggregate latency of no more than 10 ms. In this example, the other 100 slices are set up for high throughput, so that the network element must guarantee a rate of at least 100 Mbps for these slices, and the network element's maximum bandwidth is 10 Gbps. This example network element maintains a record tracking its own overall latency and throughput and may consist of two machines running network functions as containers. One machine may work with rate control mechanisms to guarantee throughput, and the other machine may run a 2-level priority queue for low latency packets and high latency packets. In the example, as long as the bandwidth through the network element is more than 4 Gbps (corresponding to the network element operating at 40% link utilization) and the network latency is less than 5 ms (equivalent to half the target goal for a low-latency network slice), the network element would simply distribute packets to both machines, and each machine would run in best-effort mode to forward packets as fast as possible. However, when the network latency reaches 5-7 ms or the bandwidth reaches 4-6 Gbps, the network element may add support for 2 "aggregate slices", one for the low latency packets, which are passed through the machine with the latency priority queue, and the other network slice containing packets that are passed through the machine with rate control functions. In this scenario, each machine would run without implementing any rate control or priority queue mechanism but rather forward packets as fast as possible. When the network latency increases over 7 ms or the total bandwidth exceeds 6 Gbps, the throughput control machine would implement the rate control mechanisms on the network slices and the 2-level priority queue mechanism would be enforced on the corresponding packets. As thresholds are changed or traffic level varied, the node may change its mode of operation between best-effort mode and a mode that implements the network slices. By using this method in conjunction with instantiating network slices, the network may have a much higher throughput overall and may be able to switch modes dynamically. Since the traffic within a network can fluctuate very rapidly, this method may also allow the node to switch between the various states rapidly and support network slices more efficiently.

Referring to FIG. 1, a block diagram of a network element 100, in which processes involved in the embodiments described herein may be implemented, is shown. Network element 100 is typically a communication device, such as a network switch, router, etc. Network element 100 may also be a server or host or another client within the network. Network element 100 may include one or more processors (CPUs) 102A-B, input/output circuitry 104, network adapter

106 and memory 108. CPUs 102A-B execute program instructions in order to carry out the functions of the present communications systems and methods. FIG. 1 illustrates an embodiment in which network element 100 is implemented as a single multi-processor computer system, in which multiple processors 102A-B share system resources, such as memory 108, input/output circuitry 104, and network adapter 106. However, the present communications systems and methods also include embodiments in which network element 100 is implemented as a plurality of networked computer systems, which may be single-processor computer systems, multi-processor computer systems, or a mix thereof.

Input/output circuitry 104 provides the capability to input data to, or output data from, network element 100. For example, input/output circuitry may include input devices, such as keyboards, mice, touchpads, trackballs, scanners, analog to digital converters, etc., output devices, such as video adapters, monitors, printers, etc., and input/output devices, such as, modems, etc. Network adapter 106 interfaces network element 100 with a network 110, which may be any public or proprietary LAN or WAN, including, but not limited to the Internet.

Memory 108 stores program instructions that are executed by, and data that are used and processed by, CPU 102A-B to perform the functions of network element 100. Memory 108 may include, for example, electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an Integrated Drive Electronics (IDE) interface, or a variation or enhancement thereof, such as enhanced IDE (EIDE) or Ultra-Direct Memory Access (UDMA), or a Small Computer System Interface (SCSI) based interface, or a variation or enhancement thereof, such as fast-SCSI, wide-SCSI, fast and wide-SCSI, etc., or Serial Advanced Technology Attachment (SATA), or a variation or enhancement thereof, or a Fibre Channel-Arbitrated Loop (FC-AL) interface.

The contents of memory 108 may vary depending upon the function that network element 100 is programmed to perform. In the example shown in FIG. 1, example memory contents are shown representing routines and data for embodiments of the processes described herein. However, it may be recognized that these routines, along with the memory contents related to those routines, may not be included on one system or device, but rather may be distributed among a plurality of systems or devices, based on well-known engineering considerations. The present communications systems and methods may include any and all such arrangements.

As shown in FIG. 1, the present communications systems and methods may include implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems are capable of running many tasks at the same time and are called multitasking operating systems. Multi-tasking is the ability of an operating system to execute more than one executable program at the same time. Each executable program is running in its own address space, meaning that the executable programs have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

Figure 2:
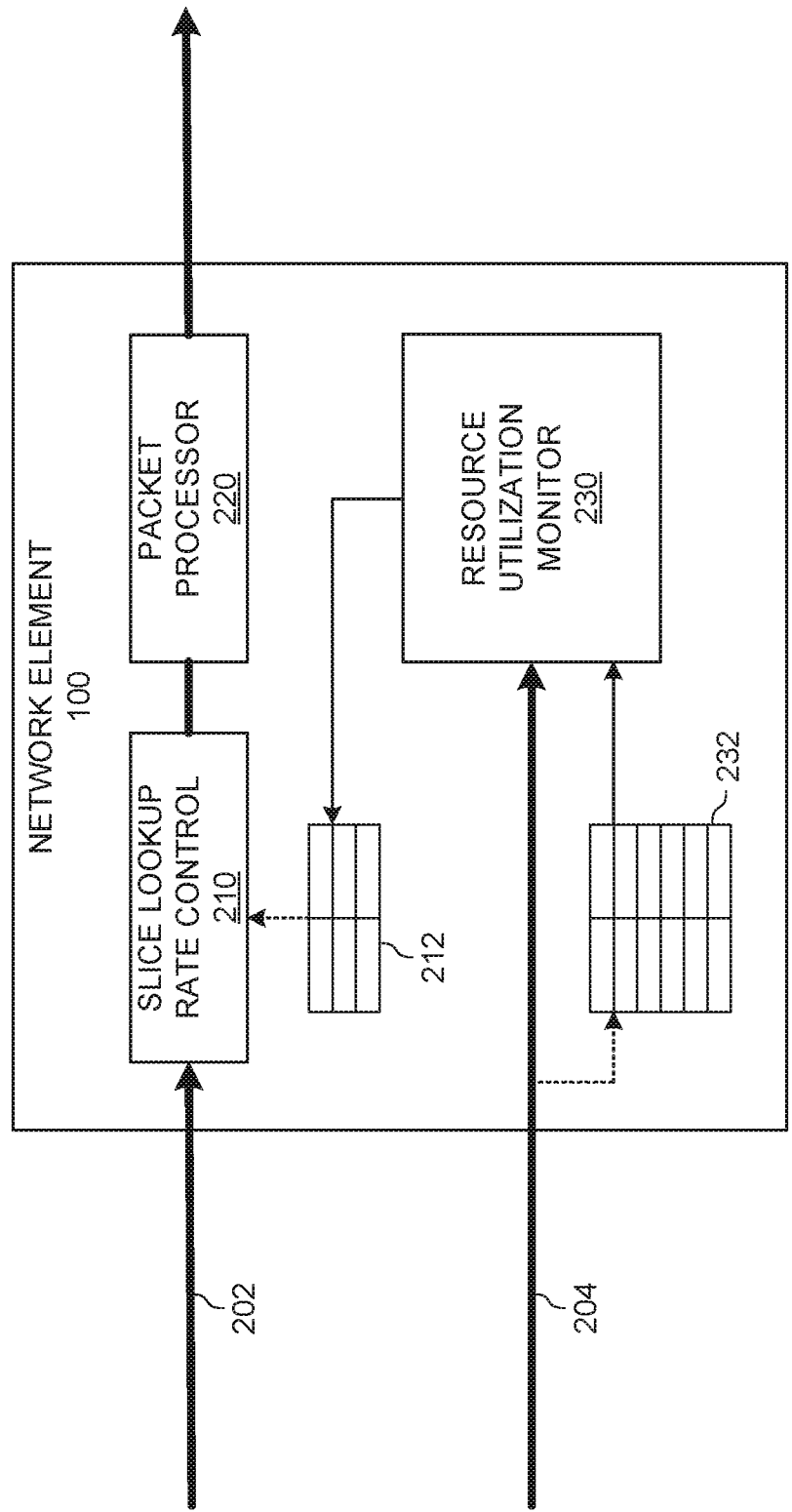
FIG. 2 is a block diagram of an example network element in which various embodiments may be implemented.

Referring to FIG. 2, a block diagram of a network element 100 is shown, in which embodiments of the invention may operate. In this scenario, network traffic is processed through the physical network such that the traffic is separated into at least two distinct planes: a control plane (or control path) 204 and a data plane (or data path) 206. This logical separation is done prior to arrival at individual network elements, which may process the traffic separately and in different ways. The control path traffic may contain the network slice management functions, including information about the various connections or slices or flows that are to be established through the network, as well as the network orchestration functions, where network slices may be instantiated as necessary and also where information about current network slices may be transmitted and received. Also included in the control path within the network element 100 is a resource utilization monitor 230 that may be programmed to look at specific performance metrics such as throughput or latency through the network element 100 and cause the network element 100 to switch between a normal, "best-effort" mode and a mode that includes advanced rate control or traffic prioritizing algorithms (instantiating network slices). The data path traffic may contain a packet processor 220 where the actual transmission of data packets occurs and therefore handles activity such as the encapsulation of packets and network forwarding decisions. The packet processor 220 may make a forwarding decision, perform GTP (GPRS Tunneling Protocol) encapsulation, and make header adjustments. The packet processor 220 may be typically implemented with 20-40 instructions. The data path 202 may determine the best path through the network element, and therefore the greater overall network, from decisions made about network slices on the control path 204 and may implement the advanced algorithms mentioned above within the network element 100 via the "slice lookup/rate control" block 210. There may be a table of active network slices in each of the control path 204 and the data path 202, such that the control path table 232 contains all the information of the packets that pass through the network element and the data path table 212 contains information of the network slices that are actually instantiated by the network element itself. The data path table 212 may be typically implemented with about 100 instructions. When throughput is not an issue, e.g., at low utilization of the network element, looking up the network slice for a packet in table 212 can increase latency significantly. When throughput is not an issue, the instantiation of a network slice may be deferred. As a result, a packet associated with the deferred network slice may be processed with 20-40 instructions (for packet processor 220) instead of 120-240 instructions (for packet processor 220 and data path table 212). Thus, when throughput is not an issue, the latency that would otherwise be experienced may be avoided. The network element 100 may acknowledge to the transmitting server or client that a network slice has been (or will be) instantiated for the packet and its traffic via the control path table 232, while the data path table 212 is used by the network element to instantiate the network slices within the network element 100. In practice, network elements may prepare for network slices by setting up their configuration and preparing a lookup table, such as the data path table 212, to acquire records for the slices from packet data fields. Once a network element has this information, it may prepare ways to handle different slices, e.g., by invoking different network functions on different machines or setting up counters for rate control. Data packets are then processed by mapping them to the correct record in the table and taking the appropriate action.

Figure 3:
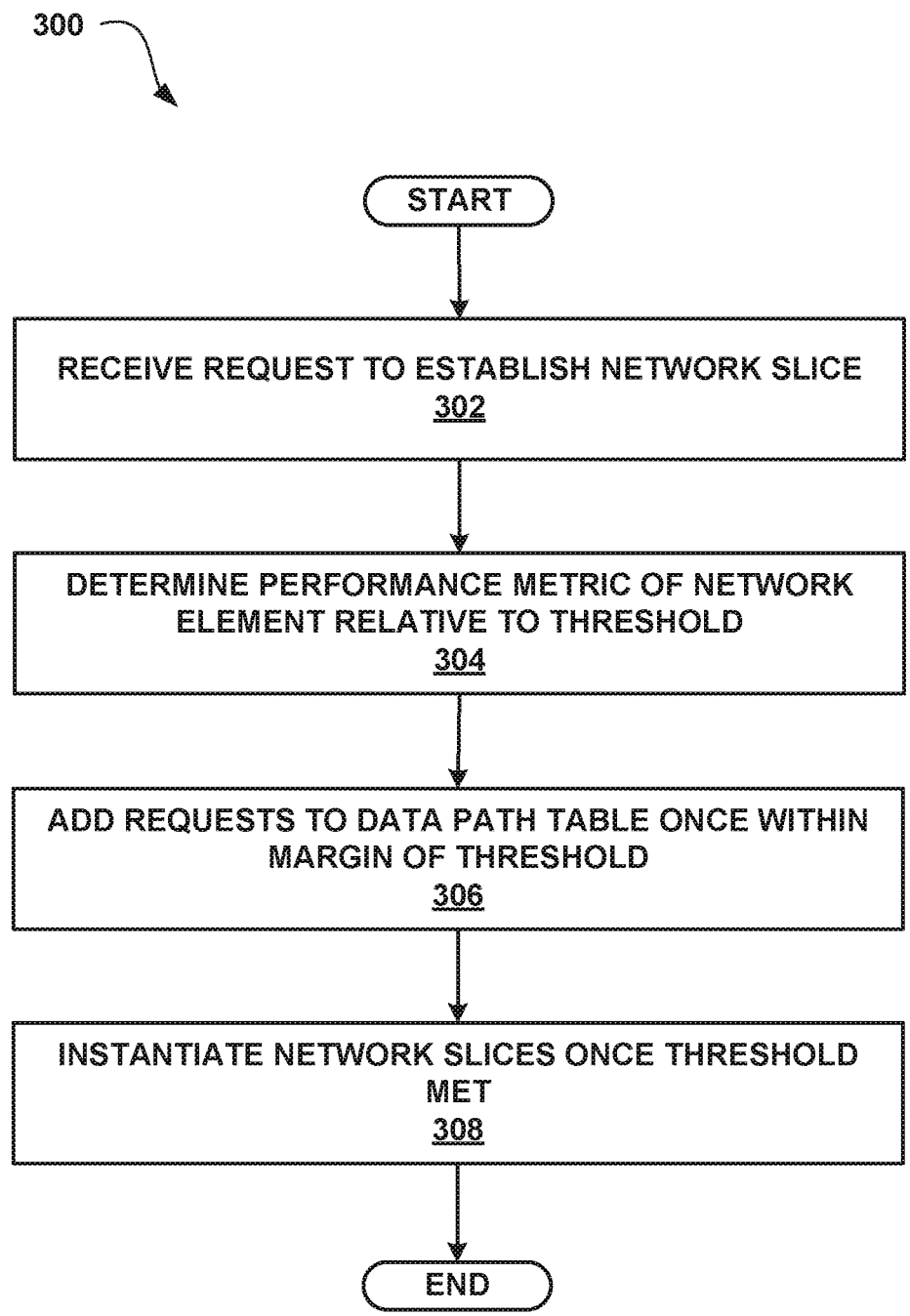
FIG. 3 is a flow chart diagram of a network slice instantiation process in accordance with one or more embodiments.

Referring to FIG. 3, an operational flowchart illustrating a network slice instantiation process 300 is depicted according to at least one embodiment. At 302, the network slice instantiation module 120 may receive a request from the network to establish network slices within the network element 100. The network slice instantiation module 120 may extract network slice requirements from the request and store the request in a control path table of network slices 232, according to an embodiment. Examples of network slice requirements include the maximum latency or minimum throughput requirements of the network slice. For instance, in the example above, low latency IoT traffic needs to be processed with aggregate latency of no more than 10 ms and high throughput network slices must guarantee a rate of at least 100 Mbps. Using the example above to illustrate what is stored in the control path table of network slices 232, with 1000 established network slices, 900 of which must be processed with aggregate latency of no more than 10 ms and another 100 slices which must guarantee a rate of at least 100 Mbps, the control path table 232 has 1000 entries, one for each requested network slice. This control path table 232 may be used to acknowledge to the appropriate client or server that the network slice has been established but does not actually set up or configure the network slice in the network element at this stage.

At 304, the network slice instantiation module 120 may measure the network utilization of the network element 100 by determining a performance metric, e.g., traffic throughput or latency through the network element 100, relative to a threshold. In the example above, the network element has a maximum throughput of 10 Gbps and there is an example throughput threshold that is preset to 4 Gbps along with a latency threshold of 5 ms. As such, so long as the net throughput through the network element is more than 4 Gbps and the network latency is less than 5 ms, the network element 100 may simply run in its default operating mode, i.e., network elements do not apply special processing to data packets unless it is necessary. In this mode, the network element 100 would not add any entries to the data path table of network slices 212, effectively delaying instantiation of network slices until the network element 100 decides it cannot meet the transmission requirements of the requested network slices without instantiating them in the network element 100. As will be discussed in FIG. 4, it should be noted that this threshold may begin as a preset in a configuration file or other mechanism. However, the method may also include machine learning that measures the association between system parameters such as length of packet buffers, throughput rate or latency at each network element and determine the thresholds dynamically for optimized performance. The establishment of thresholds may also allow for a time buffer in changing the configuration of the slices so that a slice configuration is not changed too rapidly.

At 306, if the performance metric is within a margin of the threshold, the network element 100 may determine it will not meet the transmission requirements of the network slices that are requested without instantiating the network slices. At this stage, the network slice instantiation module 120 may prepare for the instantiation of network slices by adding requests to a data path table of network slices 212. This data path table 212 contains the actual network slices that will be created by the network element 100. Such a table may mirror the control path table 232 but over time, entries may vary between the tables as the method may create aggregate slices to manage traffic through the network element. These aggregate slices reflect a decision by the network slice instantiation module 120 to establish new flows through the network element only when these flows make a difference in performance, e.g., overall bandwidth or latency through the network element dictates that special treatment must be afforded to a specific network slice and its traffic. The network slice instantiation module 120 may compare the control path table entry for the network slice request to its data path table 212 and record the information in the data path table by either adding a new data path table entry, thus creating a new network slice in the network element, or associating the request to an existing aggregate slice. At this point, no action is taken other than keeping a record of the active network slices, thus continuing to delay instantiation of network slices until the threshold is met. Using the example above, with 1000 established network slices, 900 of which must be processed with aggregate latency of no more than 10 ms and another 100 slices which must guarantee a rate of at least 100 Mbps, the control path table will have 1000 entries, one for each requested network slice, as mentioned above. However, the data path table may only have one or two entries, having grouped these 1000 network slices into aggregate slices with disparate requirements. As a result, once the threshold is met, these "aggregate slices" may be actually instantiated in lieu of the 1000 different slices that have been requested previously. This drastically reduces the processing time required to instantiate network slices and eases the load on the network element 100.

At 308, once the performance metric threshold is met, the network slice instantiation module 120 may instantiate any network slice with a request in the data path table of network slices 212. This process may begin slowly to reduce abrupt changes in behavior that may be due to instantaneous events that trigger the threshold. Continuing to use the example above, when the performance metric reaches 5-7 ms for latency and the network element 100 has added requests, including any aggregate slices, to the data path table 212, the network element may continue to run without implementing any rate control or priority queue mechanism (the default operating mode). However, once latency increases over 7 ms, the network element 100 may implement the rate control mechanisms and the 2-level priority queue mechanism may be enforced on the corresponding packets. As mentioned above, the data path table 212 may contain aggregate slices that have been added to the table by the network slice instantiation module 120. This mode of operation is distinct from the default operating mode of the network element 100 and may require heavier processing by the network element 100. It should be noted that the network element 100 may deactivate its instantiated network if the network element 100 determines that it can now meet the requirements of the requested network slices without its enhanced processing in place. In this way, the network element 100 may freely switch between its modes of operation as its network utilization varies over time, i.e., the performance metric crosses the threshold in either direction.

As one example, a plurality of requests to instantiate a network slice within a network element may be received. Each of the requests to instantiate a network slice within the network element includes a service level requirement. A performance metric of the network element is determined. In this example, assume that the performance metric is 25% of a specified level of network element throughput or utilization at a particular point in time. In addition, assume that the first threshold is 50% of network element throughput or utilization. In response to determining that the performance metric, e.g., 25%, of the network element is below the first threshold, e.g., 50%, instantiation of a network slice requested by at least one of the plurality of requests to instantiate a network slice within the network element is delayed. The delay does not cause a failure to meet a service level requirement for a particular request to instantiate a network slice if the service level requirement for the request would be met when the performance metric of the network element is 25%. In fact, in this example, the service level requirement for the particular request may be met so long as the performance metric of the network element is 50%, e.g., the network element is operating at 50% of a maximum or other specified level of throughput.

Continuing the example, assume that the plurality of requests includes first and second requests to instantiate a network slice. The first request is associated with a first level of service requirement. Assume that the first level of service requirement is met when the performance metric of the network element is 50%. The second request is also associated with a second level of service requirement. Assume that the second level of service requirement is met when the performance metric of the network element is 60%. As noted, a first threshold of network element throughput or utilization is assumed to be is 50%. In addition, assume a second threshold of network element throughput or utilization is assumed to be at 60%. If, at some point in time, the performance metric is determined to be at or above 50% (but below 60%), a first "aggregate network slice" within the network element is instantiated (the term "aggregate" is used to denote that one or more network slices may be associated with the aggregate slice). The first aggregate network slice is associated with a third level of service requirement. In this example, assume that the third level of service requirement is met when the performance metric of the network element is 50%. The first request to instantiate a network slice is associated with the instantiated first aggregate network slice. This is because the first level of service requirement is met when the third level of service requirement is met. The second request to instantiate a network slice need not be associated with the first aggregate network slice because its second level of service requirement is met as long as the performance metric of the network element is 60%, and the performance metric at this time is below 60%.

Continuing the example, assume the performance metric is later determined to be at or above 60%. As noted above, a second threshold of network element throughput or utilization is assumed to be 60%. In response to determining that the performance metric of the network element is above the second threshold, a second aggregate network slice is instantiated within the network element. The second aggregate network slice is associated with a fourth level of service requirement. In this example, assume that the fourth level of service requirement is met so long as the performance metric of the network element is 60% or less. The second request to instantiate a network slice is associated with the second aggregate network slice. This is because the second level of service requirement is met when the fourth level of service requirement is met.

In the above example, only a single network slice request was associated with the first and second aggregate network slices. However, it should be appreciated that multiple network slice requests may be associated with an aggregate network slice provided that the level of service requirement associated with the request is met when the level of service requirement associated with the aggregate network slice is met.

In the above example, only two aggregate network slices were provided. It should be appreciated that any suitable number of aggregate network slices and associated levels of service requirement may be provided.

Figure 4:
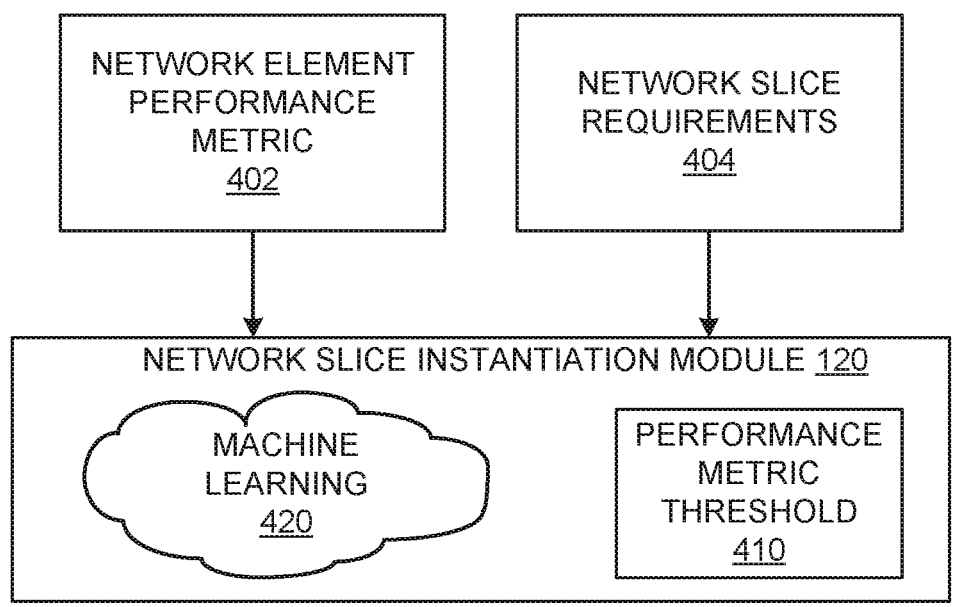
FIG. 4 shows a block diagram of the inputs and machine learning model of a process to determine a performance metric threshold to invoke the network slice instantiation process according to an embodiment.

Referring to FIG. 4, a diagram showing examples of components or modules of a performance metric threshold prediction process according to at least one embodiment. According to one embodiment, the process may include network slice instantiation module 120 which utilizes supervised machine learning 420 to determine the performance metric threshold 310 within the network element 100 to add network slice requests to the data path table 212 and instantiate network slices. The supervised machine learning model may use an appropriate machine learning algorithm, e.g., Support Vector Machines (SVM) or random forests. The network slice instantiation module 120 monitors the network element and tracks the network element resource utilization by determining a performance metric 402 and may also analyze current network slice requirements 404, i.e., the transmission requirements of the network slice. The network slice instantiation module 120 may use the above information to determine the performance metric threshold 410 for instantiating network slices and update the threshold that may be initially determined from a configuration file or other mechanism. For example, it may be discovered that a network element is saturated at a certain latency or other metric and the network slice instantiation module 120 may adjust to that change and update the threshold at which the network slice instantiation mechanism functions. It should be noted that this machine learning process may also classify the network utilization of the network element as either overutilized or underutilized. In such a process, the network slice instantiation module may learn from feedback or another mechanism about the network element's state and update its classification, and therefore the performance metric threshold 410, accordingly. The network slice instantiation module 120 would only enforce the network slices in a state where network element resources are overutilized.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
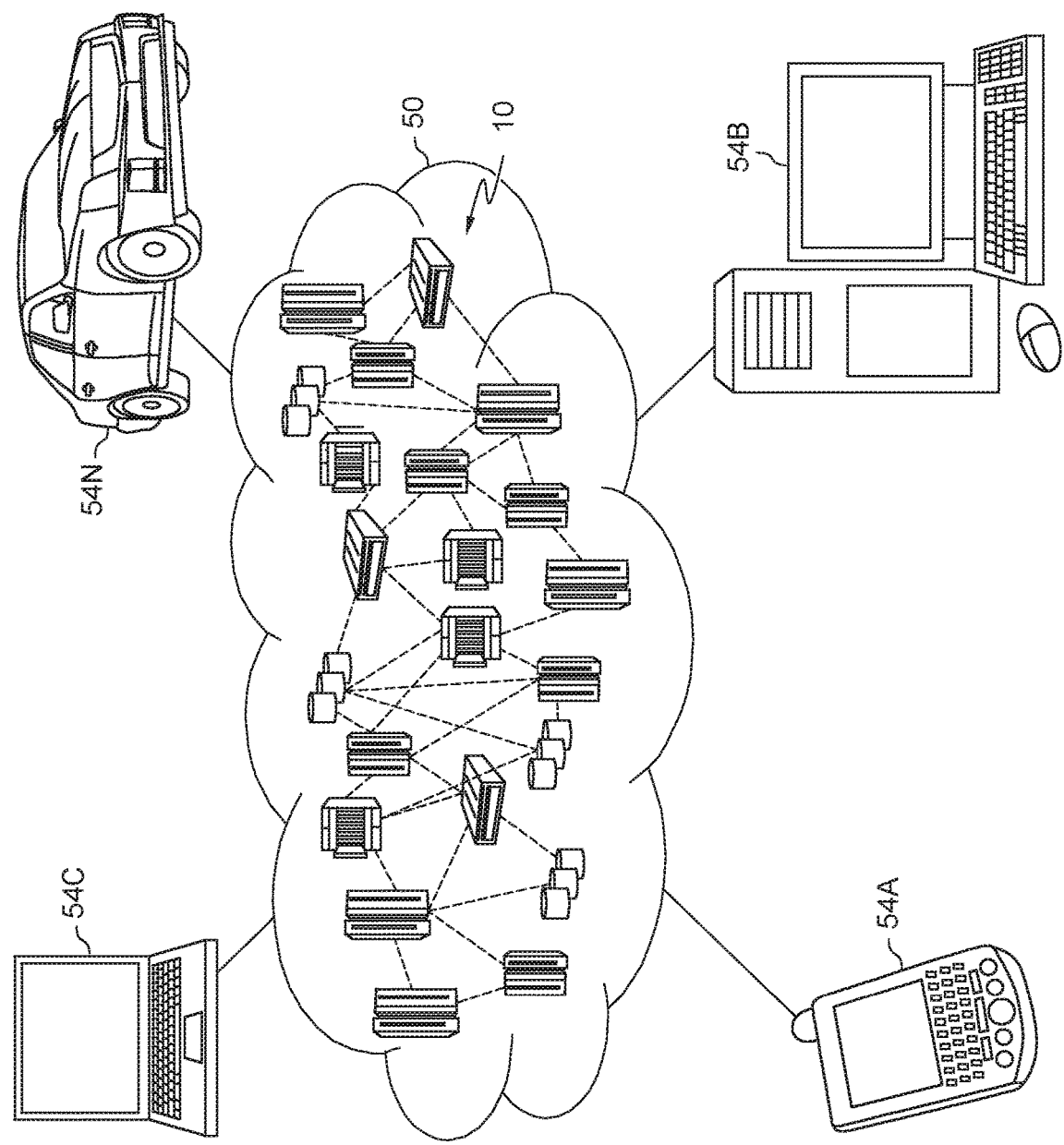
FIG. 5 depicts a cloud computing environment according to an embodiment.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
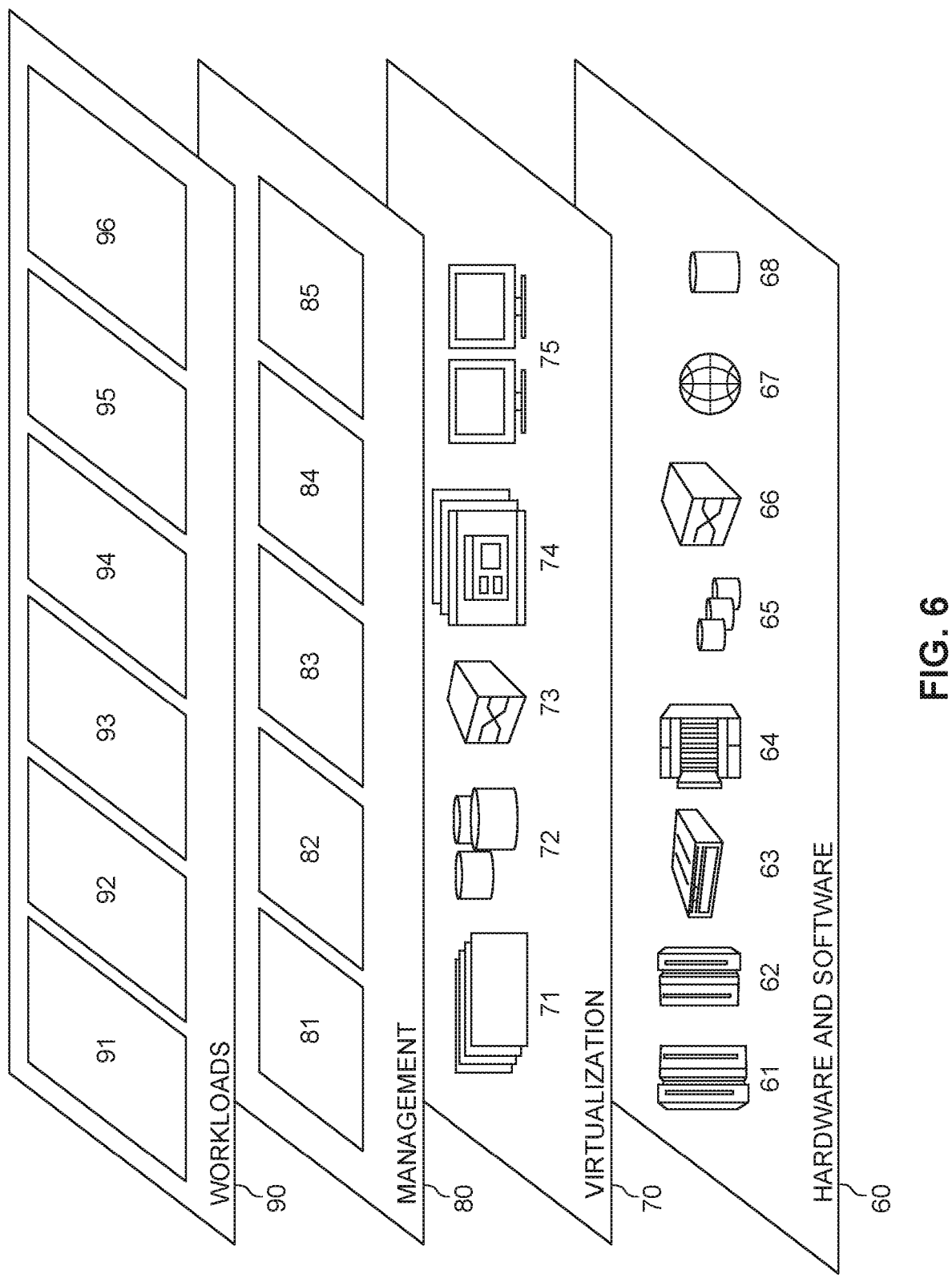
FIG. 6 depicts abstraction model layers according to an embodiment.

Referring now to FIG. 6, a set of functional abstraction layers provided by cloud computing environment 50 (FIG. 5) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66, such as a load balancer. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks and the network slice instantiation module 120; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include mapping and navigation 91; software development and lifecycle management 92; virtual classroom education delivery 93; data analytics processing 94; transaction processing 95; and other applications 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for establishing network slices within a physical network having a plurality of network elements, the method comprising:
   receiving a request to instantiate a network slice at a network element, wherein the network element includes a data path table of network slices to be instantiated;
   determining that a performance metric of the network element is below a threshold using a supervised machine learning model that monitors network element resource utilization and network slice requirements; and
   withholding the request to instantiate the network slice from the data path table of network slices to be instantiated.

2. The method of claim 1, further comprising: adding the request to instantiate the network slice to a control path table of network slices in the network element.

3. The method of claim 1, further comprising: adding the request to instantiate the network slice to the data path table of network slices to be instantiated in the network element when the performance metric of the network element is within a margin of the threshold.

4. The method of claim 1, further comprising: instantiating a requested network slice within the network element when the performance metric of the network element is at or above the threshold, wherein the requested network slice is included in the data path table of network slices to be instantiated.

5. The method of claim 4, further comprising: deactivating the requested network slice when the performance metric of the network element is below the threshold at a time subsequent to the instantiating the requested network slice.

6. The method of claim 1, wherein the performance metric of the network element is selected from a group consisting of: a throughput metric, and a latency metric.

7. A computer-implemented method for aggregating network slices within a network element, the method comprising:
   receiving a plurality of requests to instantiate a network slice within the network element, wherein the plurality of requests to instantiate the network slice within the network element includes a first request to instantiate the network slice and a second request to instantiate the network slice, wherein the first request to instantiate the network slice is associated with a first level of service requirement and the second request to instantiate the network slice is associated with a second level of service requirement, wherein the first level and the second level are distinct;
   determining a performance metric of the network element;
   instantiating a first aggregate network slice within the network element, the first aggregate network slice being associated with a third level of service requirement, when the performance metric of the network element is above a first threshold and below a second threshold; and
   associating the first request to instantiate the network slice with an instantiated first aggregate network slice, wherein the first level of service requirement is met when the third level of service requirement is met.

8. The method of claim 7, further comprising:
   deactivating the first aggregate network slice when the performance metric of the network element is below the first threshold at a time subsequent to instantiating the first aggregate network slice.

9. The method of claim 7, further comprising:
   instantiating a second aggregate network slice within the network element, the second aggregate network slice being associated with a fourth level of service requirement, when the performance metric of the network element is above the first threshold and above the second threshold; and
   associating the second request to instantiate the network slice with the instantiated second aggregate network slice, wherein the second level of service requirement is met when the fourth level of service requirement is met.

10. A computer system for establishing network slices within a physical network having a plurality of network elements, the computer system comprising:
    one or more processors, one or more computer-readable memories, and one or more computer-readable storage media;
    program instructions, stored on at least one of the one or more computer-readable storage media for execution by at least one of the one or more processors via at least one of the one or more memories, to receive a request to instantiate a network slice at a network element, wherein the network element includes a data path table of network slices to be instantiated;
    program instructions, stored on at least one of the one or more computer-readable storage media for execution by at least one of the one or more processors via at least one of the one or more memories, to determine that a performance metric of the network element is below a threshold using a supervised machine learning model that monitors network element resource utilization and network slice requirements; and
    program instructions, stored on at least one of the one or more computer-readable storage media for execution by at least one of the one or more processors via at least one of the one or more memories, to withhold the request to instantiate the network slice from the data path table of network slices to be instantiated.

11. The computer system of claim 10, further comprising: program instructions, stored on at least one of the one or more computer-readable storage media for execution by at least one of the one or more processors via at least one of the one or more memories, to add the request to instantiate the network slice to a control path table of network slices in the network element.

12. The computer system of claim 10, further comprising: program instructions, stored on at least one of the one or more computer-readable storage media for execution by at least one of the one or more processors via at least one of the one or more memories, to add the request to instantiate the network slice to the data path table of network slices to be instantiated in the network element when the performance metric of the network element is within a margin of the threshold.

13. The computer system of claim 10, further comprising: program instructions, stored on at least one of the one or more computer-readable storage media for execution by at least one of the one or more processors via at least one of the one or more memories, to instantiate a requested network slice within the network element when the performance metric of the network element is at or above the threshold.

14. The computer system of claim 13, further comprising: program instructions, stored on at least one of the one or more computer-readable storage media for execution by at least one of the one or more processors via at least one of the one or more memories, to deactivate the requested network slice when the performance metric of the network element is below the threshold at a time subsequent to instantiating the requested network slice.

15. The computer system of claim 10, wherein the performance metric of the network element is selected from a group consisting of: a throughput metric, and a latency metric.

16. A computer program product for establishing network slices within a physical network having a plurality of network elements, the computer program product comprising:
one or more computer-readable storage media;
program instructions, stored on at least one of the one or more computer-readable storage media, to receive a request to instantiate a network slice at a network element, wherein the network element includes a data path table of network slices to be instantiated;
program instructions, stored on at least one of the one or more computer-readable storage media, to determine that a performance metric of the network element is below a threshold using a supervised machine learning model that monitors network element resource utilization and network slice requirements; and
program instructions, stored on at least one of the one or more computer-readable storage media, to withhold the request to instantiate the network slice from the data path table of network slices to be instantiated.

17. The computer program product of claim 16, further comprising: program instructions, stored on at least one of the one or more computer-readable storage media, to add the request to instantiate the network slice to a control path table of network slices in the network element.

18. The computer program product of claim 16, further comprising: program instructions, stored on at least one of the one or more computer-readable storage media, to add the request to instantiate the network slice to the data path table of network slices to be instantiated in the network element when the performance metric of the network element is within a margin of the threshold.

19. The computer program product of claim 16, further comprising: program instructions, stored on at least one of the one or more computer-readable storage media, to instantiate a requested network slice within the network element when the performance metric of the network element is at or above the threshold, wherein the requested network slice is included in the data path table of network slices to be instantiated.

20. The computer program product of claim 19, further comprising: program instructions, stored on at least one of the one or more computer-readable storage media, to deactivate the requested network slice when the performance metric of the network element is below the threshold at a time subsequent to the instantiating the requested network slice.

21. The computer program product of claim 16, wherein the performance metric of the network element is selected from a group consisting of: a throughput metric, and a latency metric.

* * * * *